Aug. 1, 1939.　　　　G. E. WILSON　　　　2,168,146
MOLDING MACHINE FOR MOLDING BUILDING UNITS
Filed Jan. 28, 1937　　　6 Sheets-Sheet 1
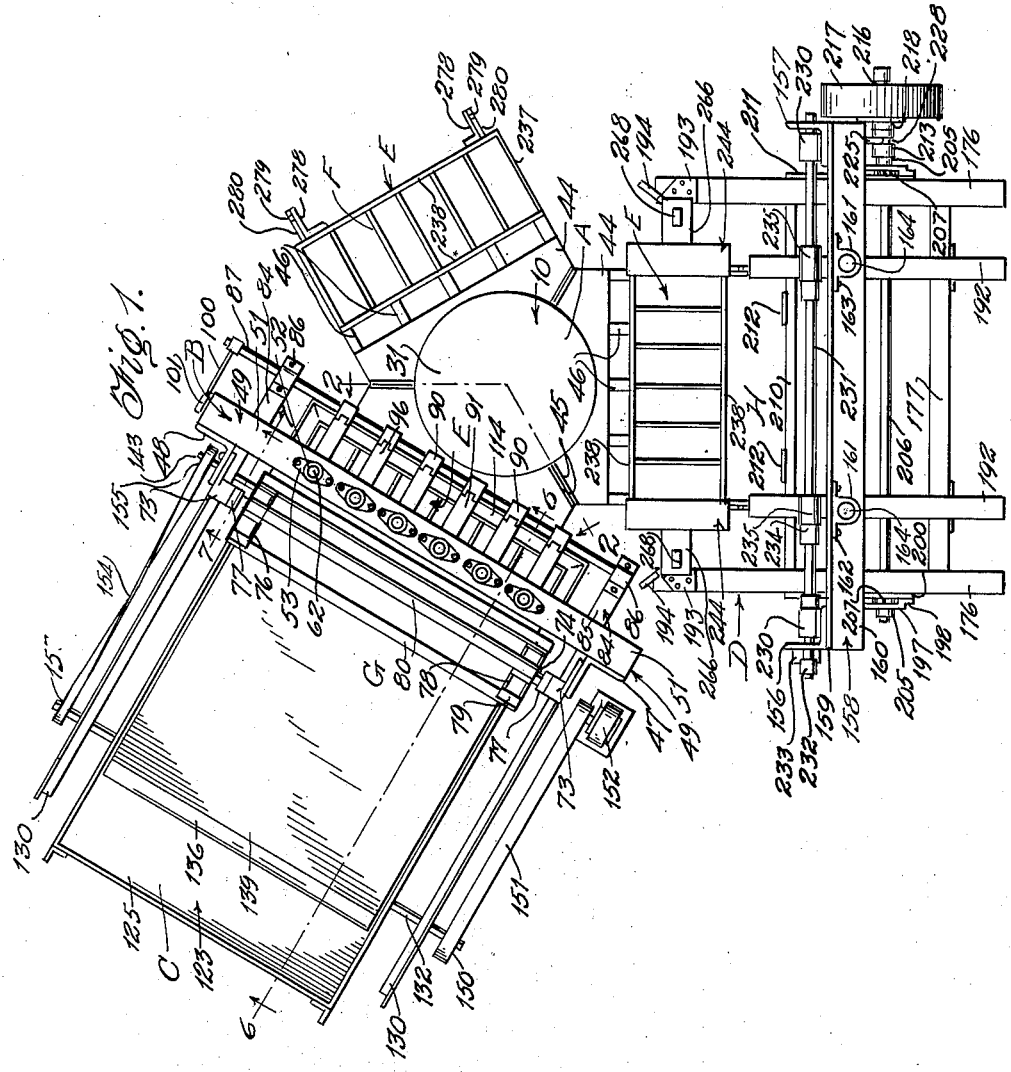
Inventor
George E. Wilson,
By Kimmel & Crowell
Attorneys Aug. 1, 1939.  G. E. WILSON  2,168,146
MOLDING MACHINE FOR MOLDING BUILDING UNITS
Filed Jan. 28, 1937  6 Sheets-Sheet 2
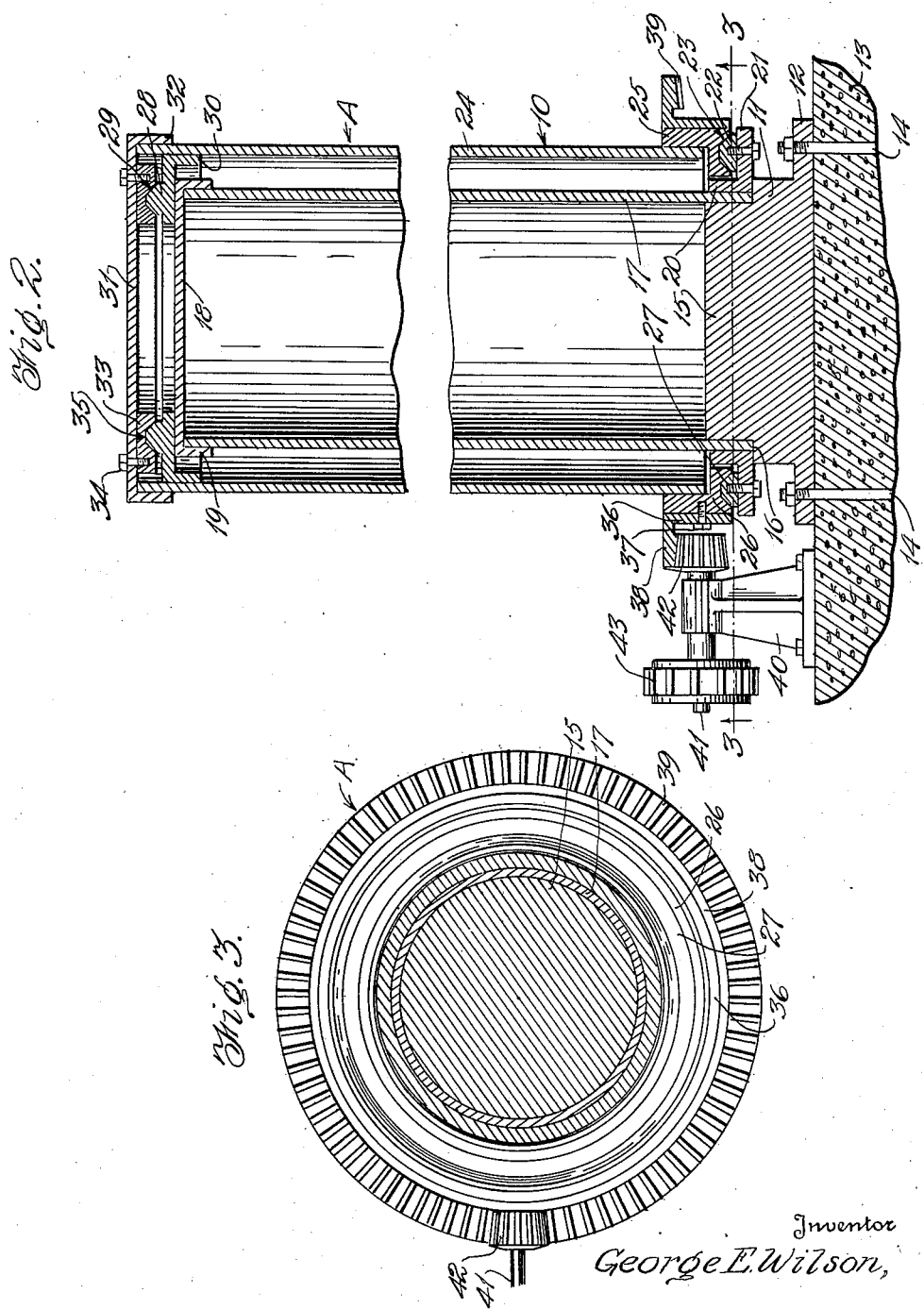
Inventor
George E. Wilson,
By Kimmel & Crowell
Attorneys.

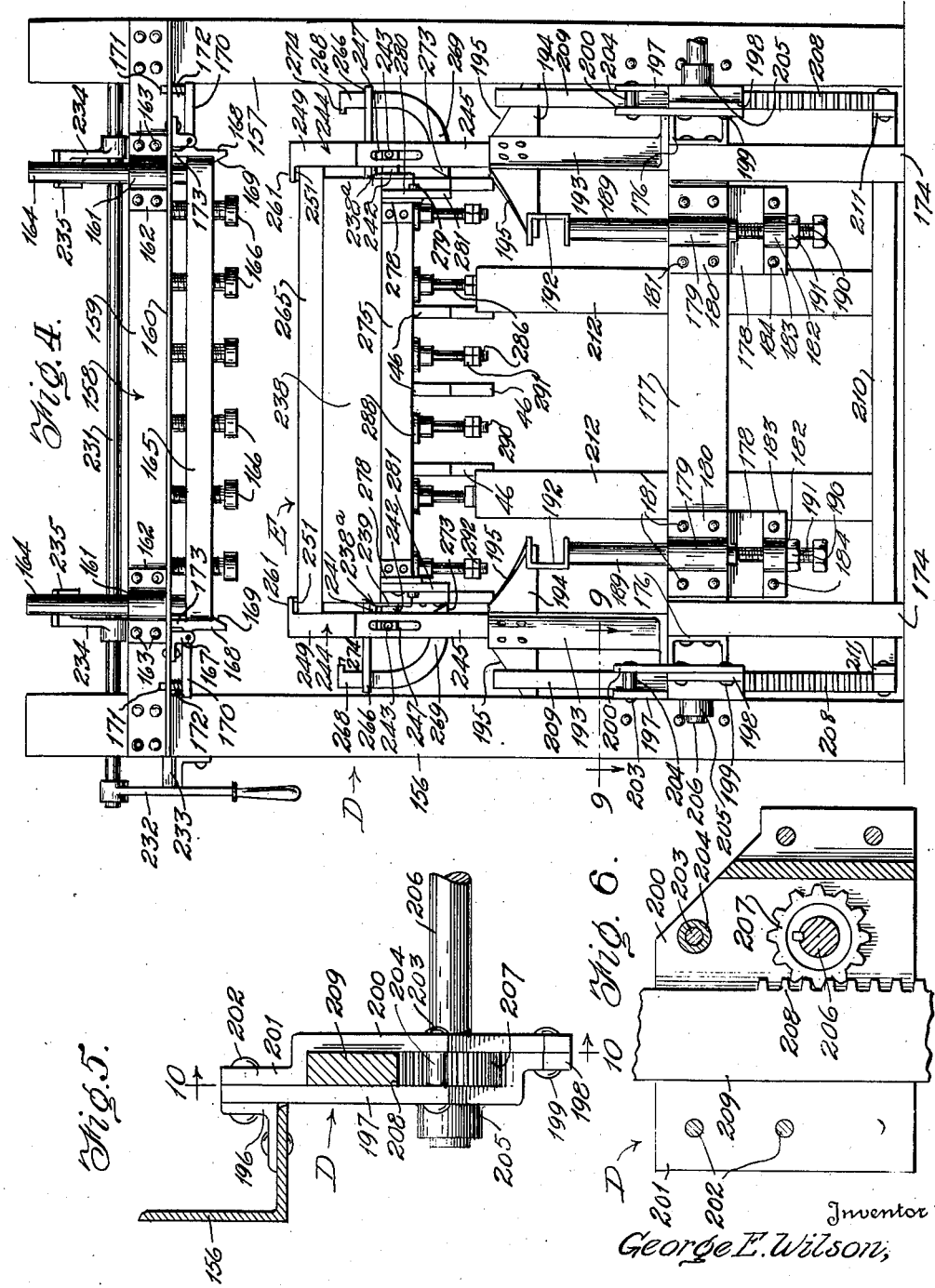

Aug. 1, 1939. G. E. WILSON 2,168,146
MOLDING MACHINE FOR MOLDING BUILDING UNITS
Filed Jan. 28, 1937 6 Sheets-Sheet 4
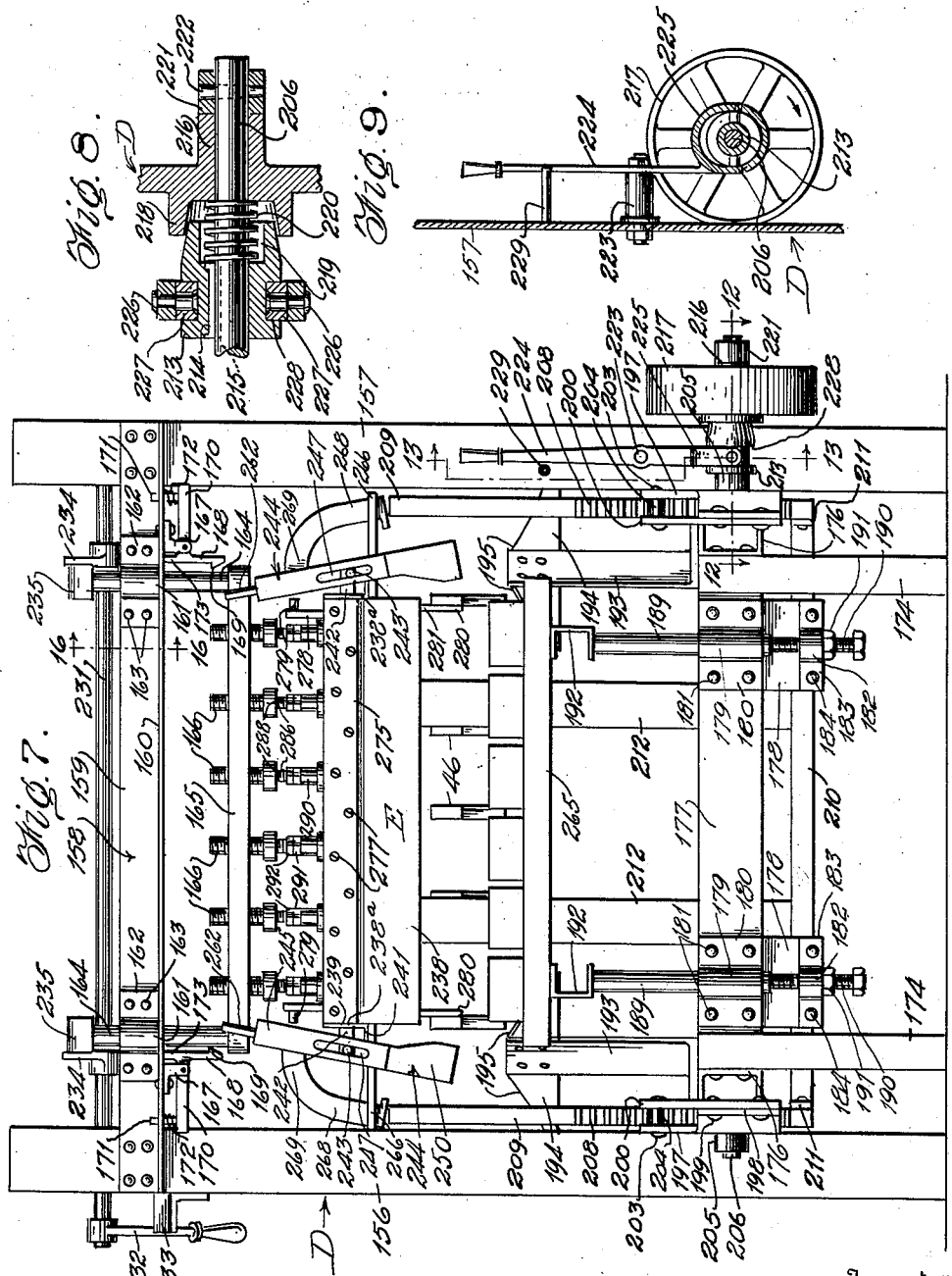
Inventor
George E. Wilson,
By Kimmel & Crowell
Attorneys

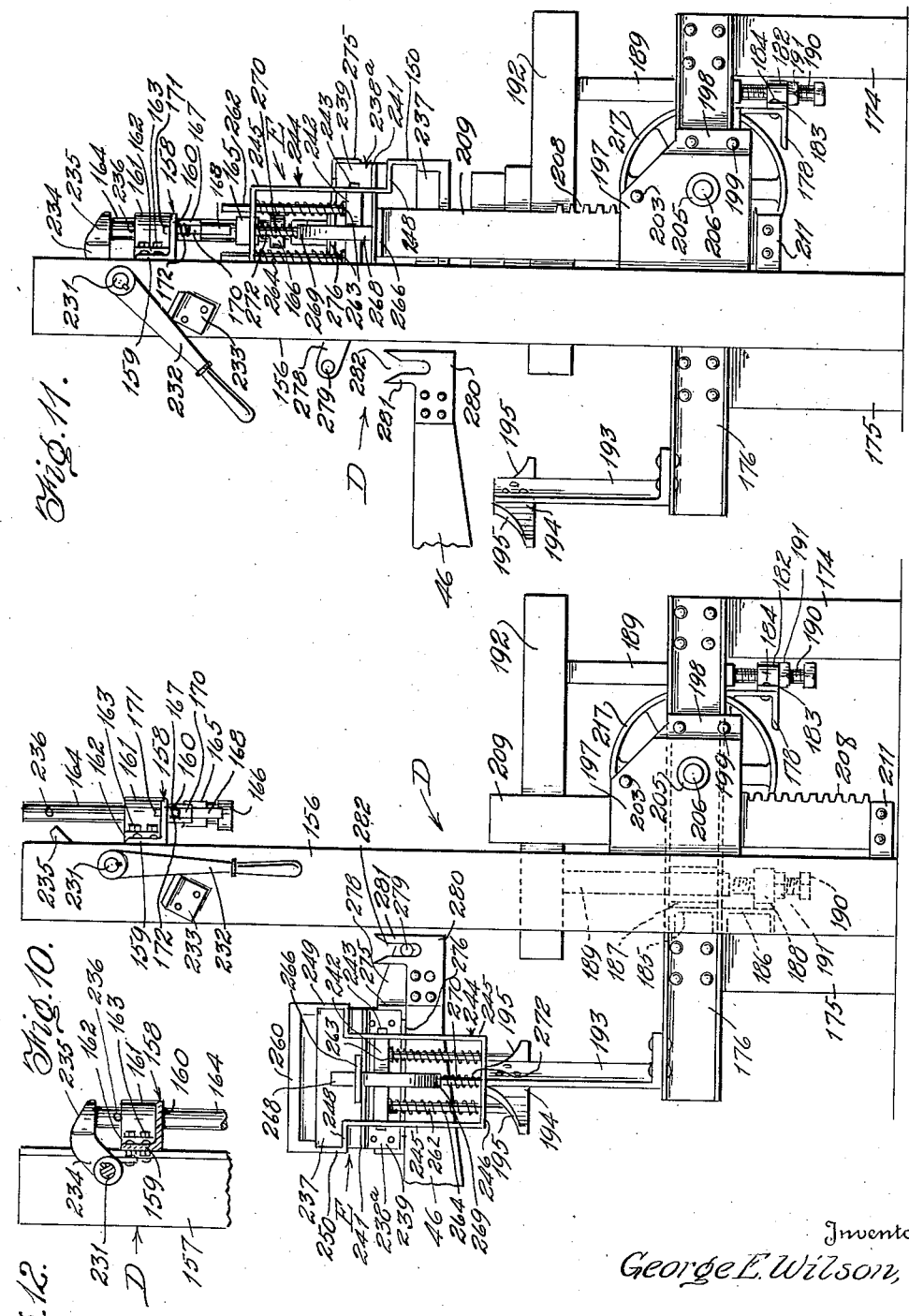

Aug. 1, 1939.   G. E. WILSON   2,168,146
MOLDING MACHINE FOR MOLDING BUILDING UNITS
Filed Jan. 28, 1937   6 Sheets-Sheet 6
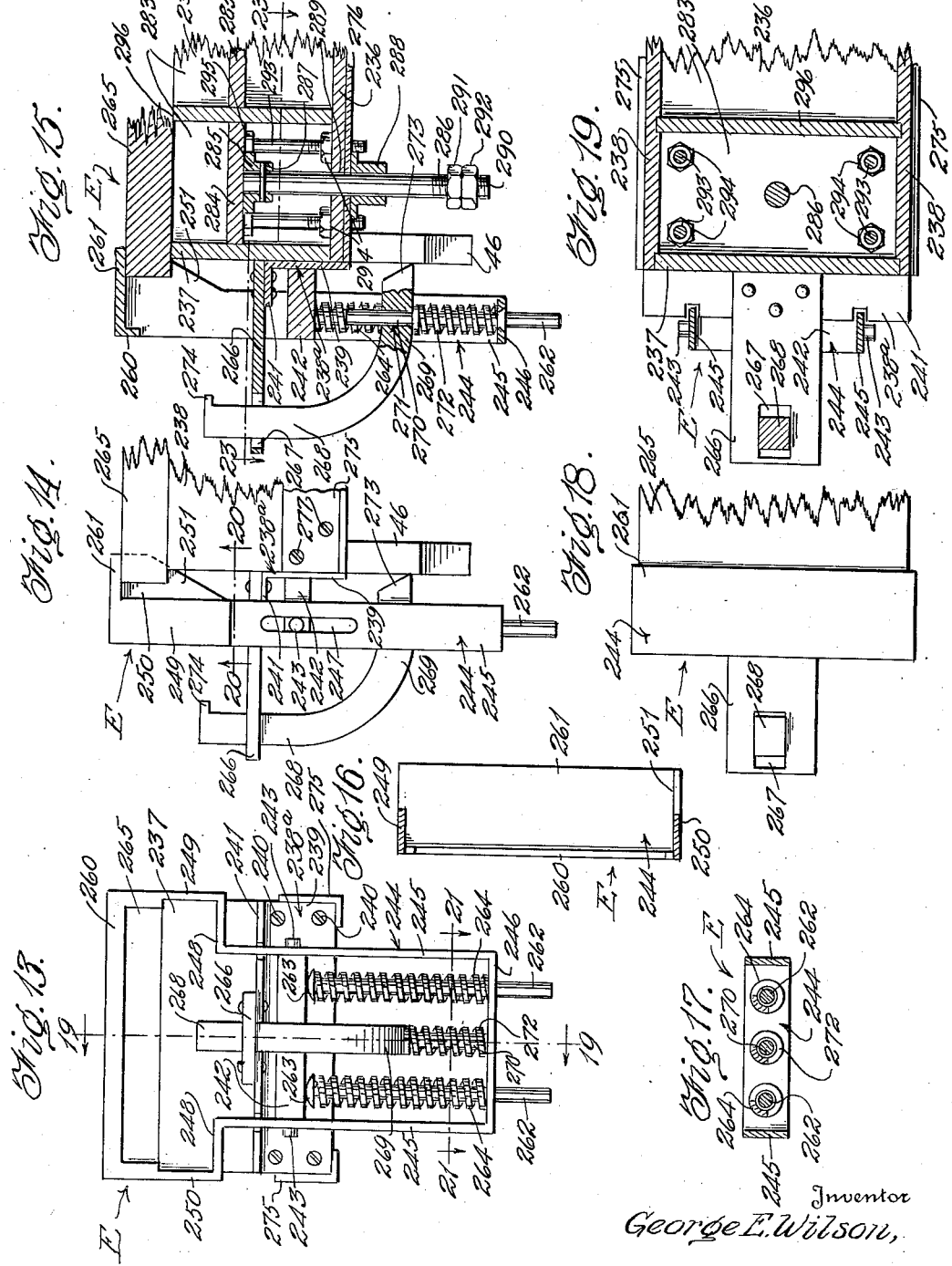
Inventor
George E. Wilson,
By Kimmel & Crowell
Attorneys Patented Aug. 1, 1939

2,168,146

UNITED STATES PATENT OFFICE 2,168,146

MOLDING MACHINE FOR MOLDING BUILDING UNITS

George E. Wilson, Fort Lauderdale, Fla., assignor, by direct and mesne assignments, to Wilson Block and Brick Machine Company, Fort Lauderdale, Fla., a corporation of Florida Application January 28, 1937, Serial No. 122,725

5 Claims. (Cl. 25—41)

This invention relates to molding machines for molding building units such as bricks, blocks tile and the like.

The present embodiment of the invention relates particularly to machines for molding such building units from cement, but it is to be understood that the invention is not limited to use for building units of cement and may be used for building units of clay or other suitable material equally well as for the manufacture of such units of cementitious material. Because the machine is not limited in use to any specific plastic material, it will be hereinafter referred to as a block molding machine, the term "block" being understood to comprehend all such building units which are ordinarily known as "bricks", "building blocks", "tile" either solid or hollow and other analogous products. Correspondingly, the articles manufactured by the machine will be termed generically "blocks" or "building blocks" and these terms are to be understood as including any and all plastic molded articles used in the construction of buildings and the like and the ornamentation thereof.

One important object of this invention is to provide a novel arrangement of block molding machine wherein structural and ornamental blocks may be made in an improved and expeditious manner.

A second important object of the invention is to provide, in a machine for the purpose set forth, a mold carrier whereby molds are supported to move by the revolution of the mold carrier part a series of stations whereat the operations of filling, tamping, stripping and cleaning or changing may be successively performed.

A third important object of the invention is to provide a novel arrangement of mold carrier and filling and tamping mechanism wherein molds for this purpose are filled and tamped by improved conveyor and tamping mechanisms.

With the above and other objects in view, the invention consists in general of certain novel details of construction and combinations and arrangements of elements hereinafter fully described, illustrated in the accompanying drawings and particularly pointed out in the appended claims.

In the accompanying drawings like characters of reference indicate like parts in the several views, and:

Figure 1 is a general plan view of a machine embodying this invention,

Figure 2 is an enlarged fragmentary section on line 2—2, Figure 1, the section showing merely the main portion of a mold support and carrier used in connection with this invention, Figure 3 is a section on line 3—3, Figure 2, Figure 4 is a front elevation of the mold stripping mechanism used in this invention, the view showing the mold support on the mold carrier before inversion, the mold carrier arm being shown but the remainder of the apparatus behind the stripping device being omitted.

Figure 5 is an enlarged detail section on line 9—9, Figure 4,

Figure 6 is a section on line 10—10, Figure 5,

Figure 7 is a view similar to Figure 4 but showing the mold in the position as shown when stripped from the blocks and the stripping mechanism in position to accord therewith, Figure 8 is an enlarged detail section on line 12—12, Figure 7, Figure 9 is a section on line 13—13, Figure 7, Figure 10 is a side elevation of the stripping device with the parts in the position as shown in Figure 4, Figure 11 is a side elevation of the stripping device with the parts in the position shown in Figure 7, Figure 12 is a detail section on line 16—16, Figure 7, Figure 13 is an enlarged end view of the mechanism at each end of the various molds used in connection with this invention, one of the molds being shown in connection therewith, Figure 14 is a side elevation of an end portion of the mold showing the mechanism of Figure 13 in its position relative thereto, Figure 15 is a section n line 19—19, Figure 13, Figure 16 is a section on line 20—20, Figure 14, Figure 17 is a section on line 21—21, Figure 13, Figure 18 is a plan view of the parts shown in Figure 14, Figure 19 is a section on line 23—23, Figure 15.

In the embodiment of the invention as herein disclosed, it will be observed from Figure 1 that the apparatus consists in general of four main parts. There is provided centrally of the entire apparatus a mold support and carrier indicated in general at A, a tamping device indicated in general at B, a mold filling device indicated in general at C and a stripping mechanism indicated in general at D. In connection with these mechanisms there are used molds, indicated in general at E of various arrangements so that blocks of different sizes and dimensions, both solid and hollow or cored can be used with the machine.

As shown in Figure 1, it will be noted that a mold E is shown at the upper right end portion, the portion of the mold being at what is preferably termed a cleaning or replacing station F. The tamping device and loading device are shown at a second station G and the stripping mechanism at a third station H, these stations being located around the center of the machine with their center lines spaced at 120° from each other.

The mold support and carrier comprises in general a central portion 10. This central portion 10 includes a base member having a body 11 and from the lower edge of this body projects a peripheral flange 12 which is fixed on a suitable foundation 13 by holding-down bolts 14 of the usual type. The body 11 has a reduced upper end 15 so that a shoulder 16 is provided between the main portion of the body and this upper end. On the shoulder 16 is seated a tubular journal member 17 preferably formed of a section of iron piping though of course it may be made from any other suitable material. The upper end of this journal member 17 is closed by a cap or cover 18 having a depending flange 19 which fits down around the outer side of the member 17 and is there secured, by any suitable means such as by welding, bolting, screwing or the like. Fixed to the lower end of the member 17 is an annular angle member having a leg 20 which extends around the member 17 and from the lower end of which extends a horizontal leg 21 forming a peripheral flange for the member 17 at its lower end. Seated on the upper face of the flange 21 is a track guide 22 having the upper part of its sides beveled as at 23. Surrounding the member 17 in spaced concentric relation thereto is a body member 24. Secured to the lower end of this body member is an annular angle member having a vertical leg 25 which fits against the outer surface of the body 10. This angle member also has a horizontal leg 26 which extends inwardly to lie over the flange 21 and in the bottom of this leg 26 is formed a groove 27 having beveled sides corresponding to the beveled sides 23 of the track 22. This track guide 22 fits in this groove and the body 24 is thus supported rotatably at its lower end by the coaction of the parts 22 and 26. Fixed upon the cover or closure 18 is a track guide 28 similar to the guide 22 and like it having beveled sides 29. Extending downwardly from the track guide 28 is a peripheral flange 30 which fits against the inner surface of the member 24 and thus assists in holding the member 24 concentric with the member 17. On the upper end of the body member 24 is fixed a closure 31 which has a depending peripheral flange 32 extending down around the outside of the member 24. This flange being suitably secured to the member 24 by any desired means. A track 33 of annular form is carried by the underside of the closure 31, being supported therefrom as by the bolts 34. This track 33 is provided with a groove 35 having beveled sides and the groove 35 and track guide 28 cooperate to support the upper end of the body 24. By means of the beveled arrangement of the groove and track guides the body 24 may freely revolve on the journal member 17. Surrounding the vertical leg 25 of the lower groove member is an angle member having a vertical leg 36 fixed to the leg 35 by suitable bolts as at 37. This angle member has a horizontal outwardly extending leg 38 forming a peripheral flange and the leg 38 is provided with beveled gear teeth 39. Mounted on the foundation 13 is a bearing stand 40 wherein is journaled a shaft 41 which extends radially of the body 24. On the inner end of this shaft is fixed a beveled pinion 42 which meshes with the gear formed by the teeth 39. On the outer end of the shaft 41 is fixed a driving wheel here shown as a sprocket 43 and this sprocket receives power from any suitable motor source. Inasmuch as this entire machine may be driven either from a single motor by suitable gearing or the separate elements may be driven from individual motors it is not deemed necessary here to show the particular motor means employed for the drive especially since such means are old and well known.

Fixed to the upper part of the body 24 is a series of castings 44 connected at their proximal ends to the flanges 45. These castings are three in number and each covers one-third of the periphery of the body 24. From each of these castings extends a series of parallel mold supporting arms 46. There thus being three sets of these molding supporting arms.

At the station G is arranged a tamping means B, and a mold filling means C driven from an electric motor 152. The said means B and C are conventionally shown in Figure 1.

After the molds have been filled and tamped they next pass to the stripping station H. The stripping mechanism located at this station is best seen in Figures 1 and 8 to 16 inclusive.

The stripping mechanism consists of a pair of vertical frame members 156 and 157 firmly fixed to the base adjacent the path of the molds carried by the mold carrier 10. These members are connected at their upper ends by a transverse frame member 158 preferably of angle iron and having a vertical flange 159 riveted or bolted to the members 156 and 157 and a horizontal flange 160 extending forwardly from the lower edge of the flange 159. Secured to the vertical flange 159 is a pair of spaced guide members 161 of tubular form, these members being provided with flanges 162 and secured in place by bolts or rivets 163. Through the members 161 extend vertical plungers 164 and the lower ends of these plungers are connected by a cross bar 165. Through the cross bar 165 are screwed a series of pusher elements 166. By reason of the screw threaded connection of these elements with the bar 165 their extension below the bar may be regulated, being desirable for the purpose hereinafter explained. Normally the cross bar 165 and pusher elements 166 are held in raised position as shown in Figure 4. In order to hold these parts raised there is secured to the flange 160 depending brackets 167 to which are pivoted depending latch members 168 having beveled noses 169 engaging beneath the member 165. Each of these latches 168 is provided with a handle portion 170 extending beneath the flange 160 and on this handle portion is a pin 171 which extends upwardly through a suitable opening in the flange 160. Around this pin between the handle 170 and flange 160 is a coiled spring 172 which urges the latch 168 into position for engaging the member 165. Furthermore each of these latches carries a stop 173 limiting the action of the spring 172.

At the forward part of the stripping mechanism is a pair of short vertical frame members 174 and aligned to the rear of the frame members 174 is a similar pair of frame members 175 (see Figures 11 and 12). The frame members 174 and 175 are connected by horizontal channel members 176 which are bolted, riveted or otherwise suitably secured to the members 174 and 175. These channel members 176 are connected adjacent their forward ends by a horizontal frame member 177. Depending from the frame member 177, adjacent the ends thereof, is a pair of brackets 178 preferably formed of channel iron. Tubular guide members 179 are provided with flanges 180 which rest against the forward face of the member 177 and are there held by suitable fastening means as indicated at 181. Secured to the members 178 in alignment with the tubular guides 179 is a pair of threaded fixed nuts 182 having flanges 183 which are secured by suitable means as at 184 to the lower ends of the brackets 178. Similarly the rear portions of the members 176 are connected by a horizontal member 185 which carries brackets 186. Guide members 187 are supported by the member 185 and fixed nuts 188 are supported by the brackets 186. Through each of the guide members 179 and 187 extends a leg 189 and the lower ends of these legs rest on the upper ends of adjusting screws 190 which are screwed through the stationary nuts 182 and 188 and are held in adjusted position by the lock nuts 191. At each side of the stripping mechanism the upper ends of the legs 189 are connected by a channel bar 192 forming a mold support.

Extending upwardly from the rear end of each of the members 176 is a bracket 193 carrying on its upper end an arcuate cam 194 having its upper surface beveled to form cam surfaces 195 inclining downwardly in both directions from the central portion of the cam.

Referring now especially to Figure 5. Attached to the forward leg of each of the members 156 and 157 is an angle bracket 196 which carries an outer housing plate 197 off set at its forward end as at 198 and suitably secured by rivets or bolts 199 to the forward end of an inner housing plate 200 offset at its rear end as at 201 and secured by rivets 202 or bolts to the bracket 196 and rear end of the plate 197. Connection to housing plates thus form a vertically extending rectangular tube. The upper portions of the middle parts of these plates are held in proper spaced relation by a rivet 203 or other securing means and this securing means passes through a spacing sleeve 204 located between the plates 197 and 200 and thus holding them in properly spaced relation. On each of the plates 197 is a bearing boss 205 and in these bearing bosses is journaled a shaft 206. This shaft passes through the parallel sides of the housing and fixed thereon in each of the housings is a gear 207 which meshes with the rock portion 208 of a lifter rod 209 supported for a vertical guiding movement in the rear end of the housings respectively. The lower ends of the lifter rods 209 are connected by a transverse member 210 having at its ends forwardly extending legs 211 which are riveted or otherwise secured to said lifter rods 209. Fixed to the bar 210 and equally spaced from the center thereof is a pair of upstanding steady rests 212.

In order that the shaft 206 may be operated when and as desired there is provided on the right hand end of this shaft a clutch member 213 carrying a key 214 which moves in a spline way 215 cut in the shaft 206. Rotatably mounted on the shaft 206 is the hub 216 of a belt pulley 217 driven by any suitable means. Carried by the hub 216 is a hollow clutch member 218, the two members 213 and 218 forming a cone clutch. The member 213 is provided with a recess 219 at its outer end and surrounding the shaft 206 is a spring 220 which seats at one end in the recess 219 and at its other end against the hub 216 at the bottom of the hollow clutch member 218. A collar 221 is secured on the end of the shaft 206 by a Morse taper pin 222 or other suitable means so that the wheel hub cannot move off of the shaft. Mounted on the frame member 157 is a bracket 223 whereon is pivoted a shipper lever 224 carrying at its lower end a shipper fork 225. This fork 225 carries inwardly projecting pins 226 whereon are mounted rollers 227 which work in a shipper groove 228 formed in the member 213. A stop pin 229 is mounted on the member 157 and the lever 227 may be sprung to lie on either side of the stop pin. This lever is best seen in Figures 7 and 9, being omitted from Figure 4. When the lever is in the position shown in Figure 7 the clutch is inactive and the belt pulley 217 may freely revolve without operating the shaft 206. When the lever 224 is shifted to the opposite side of the stop pin 229 the clutch member 213 will engage the clutch member 218 and consequently the shaft 206 will be driven, the movement being in the direction of the arrow in Figure 9. This rotation of the shaft then causes rotation of the gears 207 which act on the racks 208 to raise the lifter rods 209. Upon again shifting the lever to the position shown in Figure 7 the rods 209 are left unsupported and certain of the rods have the parts attached thereto causing the racks 208 to effect reverse movement of the shaft 206, this being possible because of the shaft being free to revolve independently of the belt pulley 217.

In order to hold the member 165 in its lowered position manually operable means are provided. To this end bearings 230 are fixed to the members 156 and 157 adjacent the upper ends thereof. These bearings support a shaft 231 which projects through a flange of the member 156 and is provided on its projecting end with an operating lever 232. A latch bracket 233 is fixed to the member 156 and is so positioned that when the lever 232 lies on one side of the bracket 233 the shaft 231 is in inoperable position while when the lever 232 lies on the other side of the bracket the shaft 231 is in operable position. Fixed on the shaft 231 is a pair of arms 234 each of which carries at its free end a latching head 235 which, as seen in Figure 12 seats on top of a respective member 164 when the latter is in its downward position. The members 164 are prevented from too great downward movement by any suitable stop means such as a pin 236 adapted to rest on top of the guide 161. It will now be seen that when the member 165 is in its lowered position and the lever 233 is in the position shown in Figure 11, the heads 235 will engage on the members 164 and these members will be prevented from rising so long as the lever 232 remains in said position. However, when the lever 232 is thrown into the position shown in Figure 10 by springing it over the bracket 233 the heads 235 will be lifted out of the path of the members 164 and member 165 may then be raised until the latches 168 engage and hold it in latched position. Obviously the member 165 is released when desired by pressing upwardly on the handle 170 and thus freeing the latches 168 from engagement with said member 165.

In order to effectively operate the stripping device, the molds used herein are of special construction. All of these molds have certain features in common. Reference being now had to Figures 13 to 19 it will be seen that the molds E are provided with a bottom 236; end walls 237 and side walls 238. This is so whether the molds are intended for molding bricks, hollow tile or other articles. Extending across the end of the mold at the lower part thereof is an angle member or bracket 238a having a vertical leg 239 which lies flat against the mold end and is secured thereto each by the screws 240. This bracket also has a horizontal leg 241. Projecting from the leg 239 in spaced relation to the leg 241 is a supporting bar or bracket 242 which is welded or otherwise suitably secured to the leg 239. At each end of this bracket 242 is a pintle 243. At each end of the mold is a frame indicated in general at 244 and this frame includes a lower part having a pair of vertical legs 245 connected at their lower ends by a transverse member 246. In the legs 245 are provided a pair of vertically extending slots 247 wherein the pintles are received, the frame being thus slidably and rockably mounted on the fixed pintles 243. At the upper ends of the legs 245 the frame is provided with outwardly extending horizontal portions 248 and at the outer ends of the portions 248 are upwardly extending vertical portions 249 and 250. Portion 249 may be termed the front upper side portion and is of uniform width throughout its height. The portion 250 may be termed the rear upper side portion and tapers from its lower end upwardly to increase in width and forms a stop wall 251. These portions 249 and 250 are connected by an upper transverse member 260 having a lip 261 which extends slightly over the end of the mold body in normal position as can well be seen in Figures 14 and 15. Below the bracket 242 and extending downwardly therefrom is a pair of guide rods 262 which are slidably mounted in suitable openings in the transverse member 246 and are provided at their upper ends with heads 263 which bear against the underside of the member 242. Surrounding each of these rods 262 is a coiled compression spring 264 which constantly urges the frame 244 downwardly so that the lip 261 is urged toward the top of the mold body. In Figures 14 and 15 there is shown a top or covering pallet 265 which is slightly longer than the mold body for which, in the position there shown, is gripped at each end by the lip 261. Now, as will be hereinafter explained, at a certain period in the operation the frames 244 are slightly raised. Of course in filling and tamping the pallet 265 is not in position to cover the mold but just before stripping operation this pallet is put in position. This is accomplished because of the fact that the frames 244 are slightly raised thus leaving sufficient space between the lips 261 and the top of the mold body to slide the pallet in from the front, the stop members 251 limiting the movement of the pallet rearwardly and thus positioning it in proper place so that when the frames 244 again descend under the influence of the springs 264 the pallet 265 will be gripped and held to cover the mold.

In order to keep the frames from accidentally tilting the following means is provided. Secured to each of the flanges 241 is an arm 266 having a slotted opening 267 in its outer end. Through this slotted opening extends a bar 268 the lower portion of which is curved so that its lower end 269 lies substantially horizontal and passes through the respective frame 244 between the springs 264. Fixed to the center of the member 246 is a guide pin 270 which extends through an opening 271 formed in the end 269. A coiled compression spring 272 surrounds the pin 270 and bears at its upper end against the underside of the end 269 and at its lower end against the frame member 246. The end 269 projects sufficiently far through the frame so that a beveled nose 273 formed thereon may normally bear against the outermost mold supporting bar 46. The upper end of the bar 268 projects normally above the arm 266 and is provided with a lip 274 limiting its downward movement. It will now be seen that with the parts as shown in Figures 14 and 15 the nose 273 prevents the frame 244 from swinging in such direction as to free the top pallet 265. If, however, the nose 273 be disengaged from the supporting bar 246 then the frame 244 can swing on the pintles 243 so as to release said pallet. Each lower longitudinal edge of the mold body is preferably reinforced with an angle member 275 and the bottom of the mold may be further reinforced by a plate 276 if desired. The angle members 275 are attached to the mold as by screws 277. One of the angle members 275 is located at the front of the mold and to this angle member is attached a pair of brackets 278 which are inclined downwardly and carry at their outer ends pintles 279. On each of the outer members of the end members 46 of the mold support there is provided a bracket 280 having at its outer end an upstanding portion 281 provided with a vertical slot 282 open at the top and having a flaring mouth. The pintles 279 engage in these slots upon the mold being supported on the members 46 but are preferably slightly above the bottom of the slots. The coaction of the pintles and slots serves to accurately position the mold on the mold carrier.

In general each of the molds is divided by transverse partitions to produce a series of cells or pockets 283. In each of these pockets 283 there is a false bottom 284 fitting closely between the pocket walls and attached to each false bottom is a socket member 285 wherein which the upper end of a push rod 286, the push rod being secured in the socket by any desired means as by the pin 287. On the bottom of the mold and in alignment below each socket 285 is secured a tubular guide member 288 and the mold bottom 236 is provided with an opening 289 aligned with the guide member 288. The rods 286 pass through the openings 289 and guide members 288 and have their projecting ends threaded as at 290 for the reception of an adjusting nut 291 and lock nut 292. The nut 291, by its adjustment on the threaded end 290, limits the extent of movement of the rod 286 through its guide member 288, the nut contacting with the end of the guide member to effect such limitation of movement. By this means adjustment is made so that the false bottom 284 may move under operating conditions sufficiently to cause plastic material filling the mold above the false bottom to be positioned entirely out of the mold. Obviously wear of the upper edges of the mold may be compensated by adjustment of this nut 291. The lock nut 292 serves in the usual manner for preventing the nut 291 from moving from its adjusted position. Through the mold bottom 236 under each of the false bottoms 284 passes a set of supporting bolts 293 and these bolts have nuts 294 threaded thereon to rest on the upper surfaces of the bottom 236, the heads 295 of the bolts engaging the under surfaces of the false bottoms 284. By the adjustment of these bolts the movement of the false bottom 284 toward the bottom 236 is limited and thus the desired depth is obtained for the block to be molded in the particular mold used.

Referring again the Figures 1 and 4 to 12 inclusive, the normal position of the mold is indicated in Figures 4 and 10. It will there be seen that the rotation of the mold carrier has caused the bottom members 246 of the frames 244 to ride up on the cams 194. This slightly lifts the frames 244 so that the pallet 265 can now be inserted. The mold is now ready for inversion. The mold, being manually grasped, is raised off of the supports 46 in such manner that the pintles 279 move downwardly to fit in the bottom of the slots 282, the back side of the mold being raised to a greater extent than the forward side. As soon as this raising takes place the springs 264 force the frames 244 downwardly and the lips 261 clamp on the pallet 265 thus holding the pallet securely to the mold. The mold is now swung manually about the axis of the pintles 279 until it moves through substantially 120° and takes an inverted position with the pallet 265 resting on the stripper frame members or table 192. The push rods 286 now project upwardly from the bottom of the mold and these push rods and the members 166 of the stripper are so positioned that upon this inversion of the mold they are in alignment with each other. The handles 170 are now operated to release the member 165 which drops downwardly and brings the heads 166 into contact with the ends of the members 286. Next the lever 232 is operated to lock the member 165 in its lowered position. The clutch member 213 is now moved by the lever 232 to engage the clutch member 218 and the shaft 206 is thereby caused to rotate and raise the push rods 209. When the mold is in inverted position, the bars 268 align with the members 209. The upward movement of these members causes engagement with the ends of the bars 268 and pushes these bars upwardly. Now at this time the noses 273 are, of course, free from the members 46 so that the frames 244 may tilt and these frames tilt to the position shown in Figure 1, the mold body being raised by the further upward movement of the members 209 until the parts assume the position shown in Figure 7. The tilting movement of the frames 244 frees the pallet 265 and, since the rods 286 are in contact with the heads 166 the body of the mold can move upwardly while the false bottoms 284 are restrained from movement so that molded blocks, indicated in Figure 7 at M are ejected from the mold to lie on the pallet 265. The latter, with the molded blocks thereon, may then be removed and taken to any suitable place for drying. When the mold has been lifted to a sufficient height the clutch 213 is released as previously described. In the lifting movement of the mold the pintles 279 pass out of the slots 282 as shown in Figure 11 but when the movement is reversed these pintles again take position in the slots 282 and the now empty mold may be again inverted in the opposite direction to take its normal position on the supporting arms or members 46, the false bottoms dropping through gravity into their load receiving positions. During the lifting movement the steady rests 212 engage the side of the mold to the rear of the stripping device and thus prevent rocking of the mold on the ends of the bars 209. With the inversion of the mold to its normal position the springs 272 and 264 act to restore the frames 244 to their normal position. Further revolution of the mold carrier now takes place and the mold is moved to station F at which place it may be replaced by another mold or cleaned in its present position. From the station F the next movement of the mold carrier brings the mold again under the filling and tamping means.

What I claim is:

1. In a block molding machine, a mold carrier including a fixed base, a journal member fixed on said base and projecting upwardly therefrom, a tubular body member surrounding said journal member, a plurality of sets of parallel arms carried by and arranged in circumferentially spaced positions about said body member, each set for supporting a mold, upper and lower track guides carried by the journal member for supporting the body member for rotation on the journal member, and means to rotate the body member.

2. In a block molding machine, a mold carrier including a fixed base, a journal member fixed on said base and projecting upwardly therefrom, a tubular body member surrounding said journal member, a plurality of sets of parallel arms carried by and arranged in circumferentially spaced positions about said body member, annular track guides supported by the journal member at the lower and upper ends thereof, annular tracks carried by the body member and coacting with the track guides to support the body member rotatably from the journal member, and means to rotate said body member.

3. In a block molding machine, a mold carrier including a fixed base, a journal member fixed on said base and projecting upwardly therefrom, a tubular body member surrounding said journal member, a plurality of sets of parallel arms carried by the body member, said sets being arranged in circumferentially spaced positions about said body member, an annular angle member attached to the lower end of the journal member and forming an outwardly extending peripheral flange on said journal member, an annular guide on the upper face of said flange and having beveled side faces, an annular track fixed to the lower end of said body member and having a groove on its under surface having beveled sides, said groove fitting on said guide, an annular guide on the upper end of said journal member and having beveled side faces, a closure on the upper end of said body member, an annular track fixed to said closure and having a groove in its under side provided with beveled side walls and fitting on the last mentioned guide, and means to rotate said body member.

4. In a block molding machine, a mold carrier including a fixed base, a journal member fixed on said base and projecting upwardly therefrom, a tubular body member surrounding said journal member, a plurality of sets of parallel arms carried by the body member, said sets being arranged in circumferentially spaced positions about said body member, an annular angle member attached to the lower end of the journal member and forming an outwardly extending peripheral flange on said journal member, an annular guide on the upper face of said flange and having beveled side faces, an annular track fixed to the lower end of said body member and having a groove on its under surface having beveled sides, said groove fitting on said guide, an annular guide on the upper end of said journal member and having beveled side faces, a closure on the upper end of said body member, an annular track fixed to said closure and having a groove in its under side provided with beveled side walls and fitting on the last mentioned guide, an annular bevel gear supported from the lower end of said body member, a driving pinion meshing with said gear, and means to drive said pinion.

5. In a block molding machine, a mold carrier for moving a mold along a fixed path, a mold supported on said carrier, coacting means on the carrier and mold supporting said mold for swinging through a vertical arc to invert the mold, a pallet adapted to cover the top of the mold on the carrier, pallet clamping means carried by said mold and movable to lift above and engage with the pallet when on the mold, and means adjacent the path of said carrier engaging said clamping means to raise them for placing of the pallet.

GEORGE E. WILSON.